(12) United States Patent
Phillips et al.

(10) Patent No.: US 7,617,810 B1
(45) Date of Patent: Nov. 17, 2009

(54) COUNTERWEIGHT SHAFT CONSTRUCTION WHICH REDUCES LUBRICANT AERATION

(75) Inventors: George E. Phillips, Oshkosh, WI (US); Wayne M. Jaszewski, Jackson, WI (US); Gregory L. Fugar, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 86 days.

(21) Appl. No.: 11/949,425

(22) Filed: Dec. 3, 2007

(51) Int. Cl.
*F02B 75/06* (2006.01)
(52) U.S. Cl. .................................... 123/192.2; 74/603
(58) Field of Classification Search ............ 123/192.1, 123/192.2, 198 E; 464/180; 74/579 R, 589, 74/590, 603
See application file for complete search history.

(56) References Cited

U.S. PATENT DOCUMENTS

| | | |
|---|---|---|
| 3,725,969 A | 4/1973 | Horeni |
| 4,116,575 A | 9/1978 | Nakatogawa |
| 4,282,810 A | 8/1981 | Ellis |
| 4,356,605 A | 11/1982 | Everts |
| 4,424,041 A | 1/1984 | Sietmann et al. |
| 4,536,731 A | 8/1985 | Kubach et al. |
| 5,251,859 A | 10/1993 | Cyrell et al. |
| 5,401,199 A | 3/1995 | Shibata |
| 5,899,120 A * | 5/1999 | Leith ........................ 74/603 |
| 6,237,442 B1 | 5/2001 | Killion |
| 6,412,170 B1 | 7/2002 | Happenhofer et al. |
| 6,418,902 B1 | 7/2002 | Ericson |
| 6,682,437 B2 | 1/2004 | Killion et al. |
| 7,273,028 B1 | 9/2007 | Ho |
| 2006/0137645 A1* | 6/2006 | Friedrich ................ 123/192.2 |

OTHER PUBLICATIONS

"mold." Merriam-Webster Online Dictionary. 2009. Merriam-Webster Online. Aug. 11, 2009 <http://www.merriam-webster.com/dictionary/mold>.*

* cited by examiner

*Primary Examiner*—Noah Kamen
(74) *Attorney, Agent, or Firm*—William D. Lanyi (57) ABSTRACT

A casing is provided to be disposed around at least a portion of a counterweight of a balance shaft in order to define a circumferential surface surrounding the counterweight which has a generally constant radius relative to the axis of rotation. The function of the casing is to reduce or eliminate aeration of oil in which the balance shaft is disposed.

5 Claims, 7 Drawing Sheets

FIG. 8

COUNTERWEIGHT SHAFT CONSTRUCTION WHICH REDUCES LUBRICANT AERATION

BACKGROUND OF THE INVENTION

1. Field of the Invention

The present invention is generally related to a shaft of an engine having a counterweight and a housing structure disposed at least partially around the counterweight and, more particularly, to a casing structure which defines a generally circumferential surface surrounding the counterweight in which the surface has a generally constant radius relative to an axis of rotation about which the shaft rotates.

2. Description of the Related Art

Many different products are known in which a shaft of some type is provided with an overmolded structure which encapsulates the shaft.

U.S. Pat. No. 3,725,969, which issued to Horeni on Apr. 10, 1973, describes a polishing device. A generally cylindrical molded member encapsulates an elongated driveshaft to form a solid, generally cylindrical mass for supporting a polishing cloth.

U.S. Pat. No. 4,116,575, which issued to Nakatogawa on Sep. 26, 1978, describes an encapsulated reinforcement in a moulded shaft. A coupling shaft is provided with a resilient member molded integrally therewithin during the molding process of the shaft and which is used to prevent a knob from loosening during service.

U.S. Pat. No. 4,282,810, which issued to Ellis on Aug. 11, 1981, describes a print roller. It is used for applying dye to a textile material in a predetermined pattern and is provided wherein the core of the roller, which is operatively supported in a rotatable position by a shaft, is encapsulated with a cover formed of a substantially impervious elastomeric material. Dye applicators are then bonded to the cover.

U.S. Pat. No. 4,356,605, which issued to Everts on Nov. 2, 1982, describes a crankshaft with a laminated counterweight. The counterweight comprises a plurality of substantially flat plates, each of which has a first and a second shaft mounting hole therethrough and at least one depression on one side and a boss on the other side. The plates are identical and are pressed together so that the bosses enter the depressions. Shafts are pressed into the aligned first and second holes, and an integral fully aligned torque resistant counterweight and crankshaft results.

U.S. Pat. No. 4,536,731, which issued to Kubach et al. on Aug. 20, 1985, describes an electric control motor. The motor comprises a housing made using a ferromagnetic material, a housing enclosure and a cap, a shaft rotatably disposed therein on which an armature is disposed for association with arcuate poles provided in the housing. An electromagnetic coil comprising coil portions is mounted axially with respect to the armature in coil retainers encapsulating the armature and shaft as a unit for ease of assembly in the housing.

U.S. Pat. No. 5,251,859, which issued to Cyrell et al. on Oct. 12, 1993, describes a support mount. It has a clamp with a fulcrum and a clamp plate extension. The clamp plate extension has a concave, circular toothed depression forming one half of a socket to hold a ball. The other half of the socket is formed by a jaw plate also having a concave, circular toothed depression positioned on the opposite side of the ball to the clamp plate extension. The jaw plate is positioned on the fulcrum and is kept aligned on the clamp plate by a keyway rib and slot structure. The jaw plate is tightened by a bolt or screw that passes through both the jaw plate and the clamp plate extension into a cap nut. The ball is attached to a shaft which is, in turn, attached to an ultimate support mount. Welded to and encircling the shaft is an eccentric ring. The eccentric ring and shaft are encapsulated by the ball, the ball material passing through and around the eccentric ring and shaft. In a tubular shaft, the open portion of the shaft is also left opened by the ball so that wires or other materials may be passed through the shaft. Due to the eccentric ring within the ball and encircling the shaft, enhanced support performance and strength are realized by the adjustable support mount.

U.S. Pat. No. 5,401,199, which issued to Shibata on Mar. 28, 1995, describes an outboard motor engine. Two embodiments of balancer arrangements for internal combustion engines particularly adapted for use in outboard motors are described. In each embodiment, the balancer shaft is journaled within the crankcase chamber of the engine and is driven from the crankcase from a point between its ends. Single and twin balancer shaft arrangements are disclosed.

U.S. Pat. No. 5,899,120, which issued to Leith on May 4, 1999, describes a crankshaft with laminated counterweights. A laminated counterweight for connecting the main shaft with the crank pin of a crankshaft in which the counterweight includes a pair of end laminations which are circular in shape and have a central opening dimensioned to receive the main shaft and a crank pin opening radially spaced from the central opening and dimensioned to receive the crank pin is described. A plurality of central laminations is sandwiched in between the end laminations. Each central lamination, like the end laminations, includes a central opening dimensioned to receive the main shaft as well as a crank pin opening dimensioned to receive the crank pin. A pair of cutouts is provided through each central lamination and, such cutouts being disposed on opposite sides of the radius extending between the central opening and the crank pin opening.

U.S. Pat. No. 6,237,442, which issued to Killion on May 29, 2001, describes a high value static unbalance-type balance shaft. The shaft for rotating machinery such as vehicle engines includes a bearing surface adjacent an end. The balance shaft includes a balance weight adjacent the first end and a connector portion connecting the balance weight to the other end. The connector portion has a cross-section with at least one recessed surface thereby minimizing the mass or weight of the balance shaft and optimize the material of the balance shaft.

U.S. Pat. No. 6,412,170, which issued to Happenhofer et al. Jul. 2, 2002, describes a method of manufacturing a control flap. A first sleeve and a second sleeve are put into the shaft at a predetermined axial distance apart and are pressed radially. The shaft is encapsulated between the first and second sleeve with a thermoplastic in such a way that a vane body, which has at least one aperture, is formed. The vane body is encapsulated with a sealing compound in such a way that a sealing lip is formed on the vane body at the margins.

U.S. Pat. No. 6,418,902, which issued to Ericson on Jul. 16, 2002, describes a composite full circle crankshaft counterweight. A composite crankshaft counterweight of a two-cycle internal combustion engine includes a "T" shaped counterweight surrounded by a cup-shaped retainer that holds light weight inserts against the counterweight. Together with the counterweight the inserts create a full circle that reduces the empty volume in a crankcase of a two-cycle engine.

U.S. Pat. No. 6,682,437, which issued to Killion et al. on Jan. 27, 2004, describes static unbalance-type balance shafts with axis alignment preservation. A static unbalance-type balance shaft for canceling unbalance forces of an engine include a principal bearing journal located adjacent a first end of the shaft and an outrigger bearing journal located adjacent the second end of the shaft. A first counterweight is positioned adjacent one side of the principal journal and a second counterweight is positioned on the other side of the principal journal. The balance shaft has a small third outrigger counterweight or other source of unbalance positioned adjacent the outrigger journal for maintenance of the shaft's effective plane of static unbalance within the length of the principal journal while allowing the composite center of gravity of the first and second counterweights to be shifted away from the outrigger unbalance, for the purpose of improving the stability of shaft operating shape at the outrigger journal end of the shaft across the entire range of operating speeds.

U.S. Pat. No. 7,273,028, which issued to Ho on Sep. 25, 2007, describes a noise suppressing mechanism for a balance gear of engine crankshaft. A noise suppressing mechanism for a balance gear system of an engine crankshaft is described. The balance gear system includes a primary gear, a secondary gear, and a torsional spring and is fit on a balance shaft. The noise suppressing mechanism includes a circular flange formed on the primary gear and the secondary gear forms a central bore rotatably fit over the circular flange for free rotation about the circular flange with respect to the primary gear. The torsional spring is arranged between the primary and secondary gears. The primary gear forming a securing hole in which a stem section of a limiting pin is received and fixed. The secondary gear forms a through hole in which a head section of the limiting pin is accommodated with a gap formed between the head section and an inside diameter of the through hole. The gap allows for a limited angular shift of the secondary gear with respect to the primary gear. Such an arrangement provides a noise suppressing mechanism having less number of parts and being ready to assemble.

The patents described above are hereby expressly incorporated by reference in the description of the present invention.

SUMMARY OF THE INVENTION

A shaft of an engine, made in accordance with a preferred embodiment of the present invention, comprises a counterweight attached to the shaft for rotation with the shaft about an axis of rotation. The counterweight has a center of gravity which is displaced radially from the axis of rotation. The shaft also comprises a housing structure, or casing, disposed at least partially around the counterweight to define a circumferential surface surrounding the counterweight which has a generally constant radius relative to the axis of rotation.

In one embodiment of the present invention, the shaft is a balance shaft which rotates in synchrony with a crankshaft of the engine. In an alternative embodiment, the shaft is a crankshaft of the engine.

The housing structure, or casing, is overmolded on the counterweight in a particularly preferred embodiment of the present invention. The housing structure can comprise a polymer material. Alternatively, the housing structure or casing can comprise a tubular structure attached to the counterweight. In yet another alternative embodiment of the present invention, the housing structure, or casing, can comprise a segment of a disc which is shaped to cooperate with the counterweight to define a generally disc shaped structure when the housing structure is combined with the counterweight.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Throughout the description of the preferred embodiment of the present invention, like components will be identified by like reference numerals.

Figure 1:
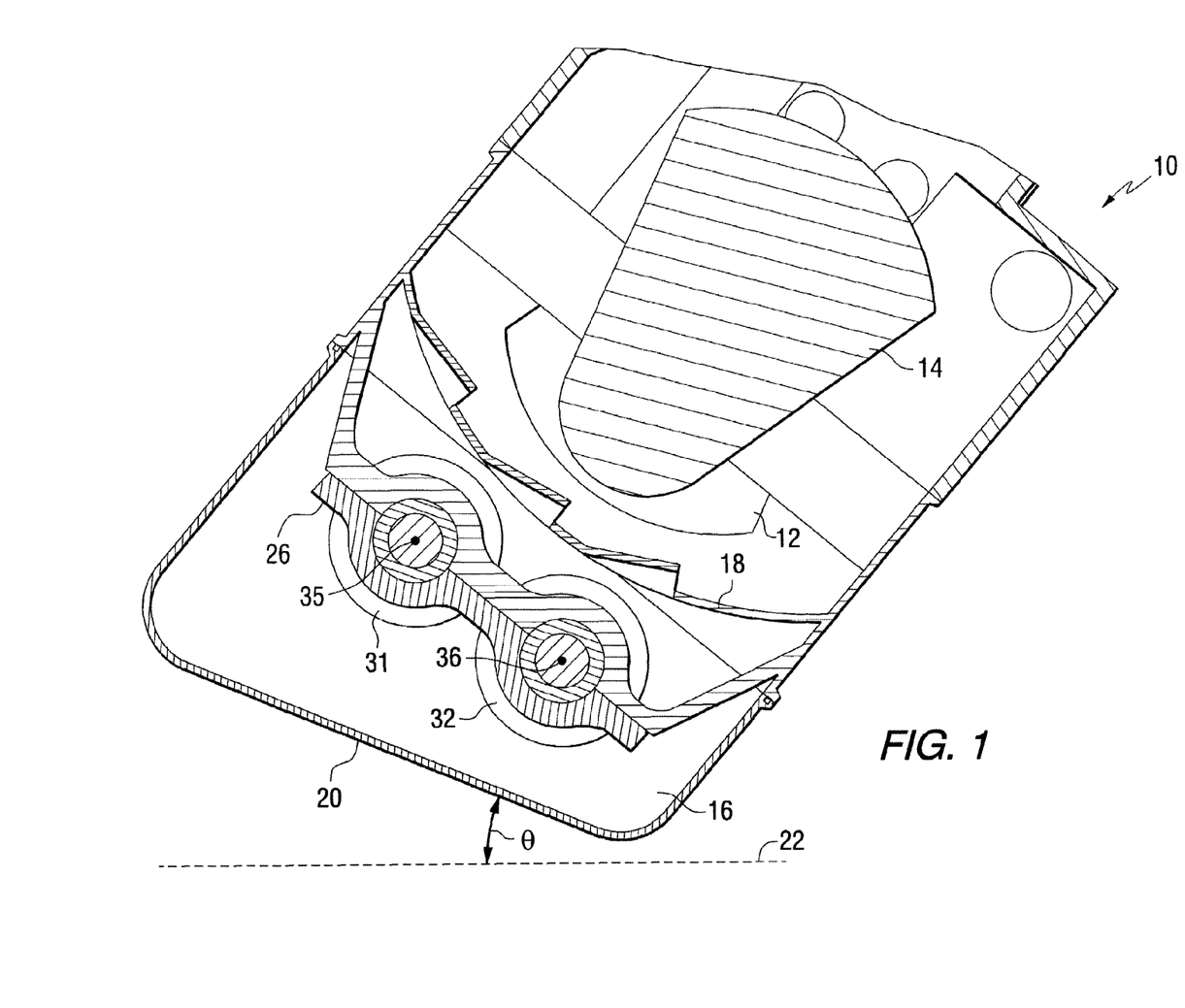
FIGS. 1 and 2 are section views of an engine structure showing the relative locations of balance shafts to other components of the engine.

FIG. 1 shows the lower part of an engine structure including a crankshaft counterweight 12 which is not shown in section view and a second crankshaft counterweight 14 which is shown in section view. An oil reservoir portion 16 is located at a lower portion of the engine and is separated from the crankshaft by a louvered member 18. The lower surface 20 of the crankcase is disposed at an angle θ from a horizontal line 22. Although the engine 10 shown in FIG. 1 is tilted so that the movement of the reciprocating pistons is in a plane that is at an angle from the horizontal line 22, this specific characteristic of the engine is not directly related to all applications of the basic concepts of the present invention.

With continued reference to FIG. 1, it can be seen that in the oil reservoir 16, a support structure 26 is provided to support two balance shafts, 31 and 32, for rotation about their respective axes, 35 and 36. Although not shown in FIG. 1, the balance shafts, 31 and 32, are connected in torque transmitting relation with the crankshaft in order to provide a balancing feature for the engine 10.

Figure 2:
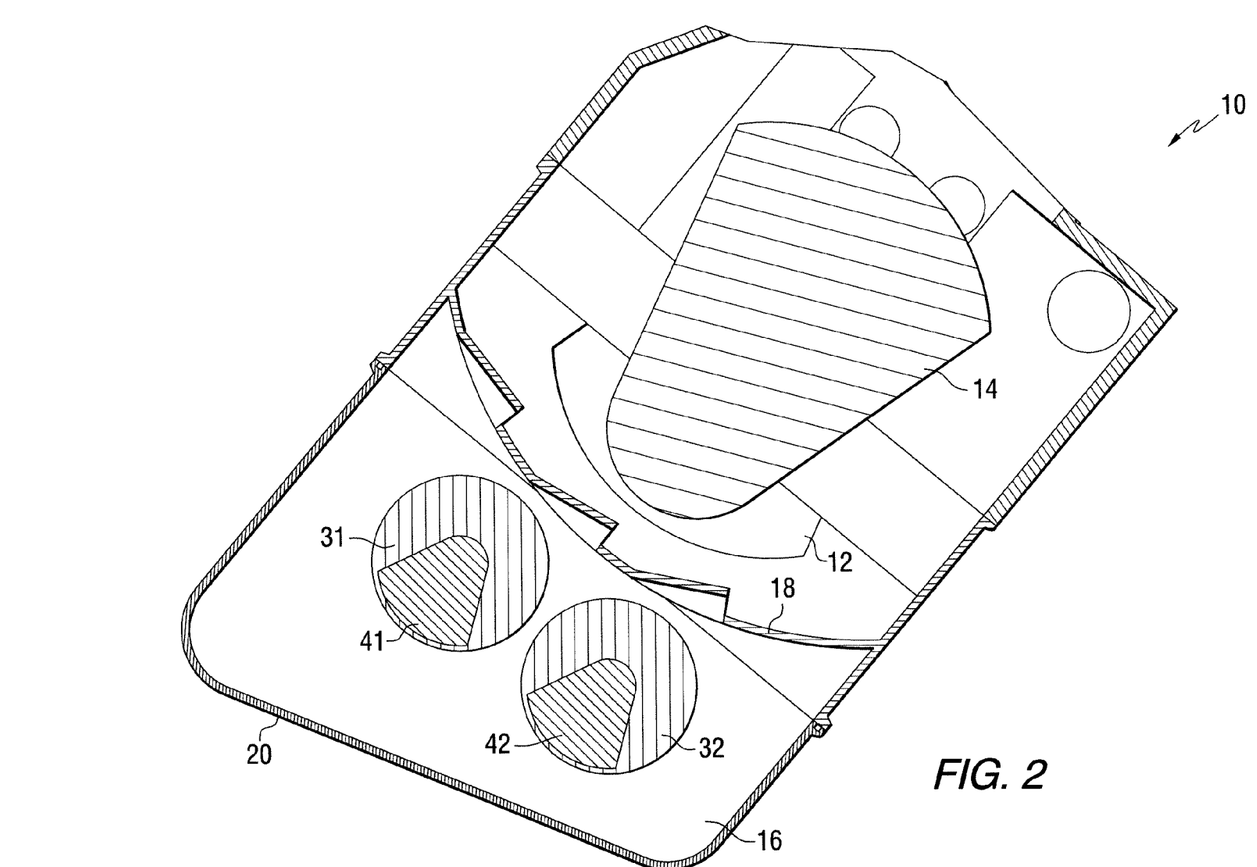

FIG. 2 is an alternative section view of the engine 10 showing the counterweights 41 and 42, of one particular embodiment of the present invention. FIG. 2 will be described in greater detail below in conjunction with FIG. 4.

Figures 3, 4:
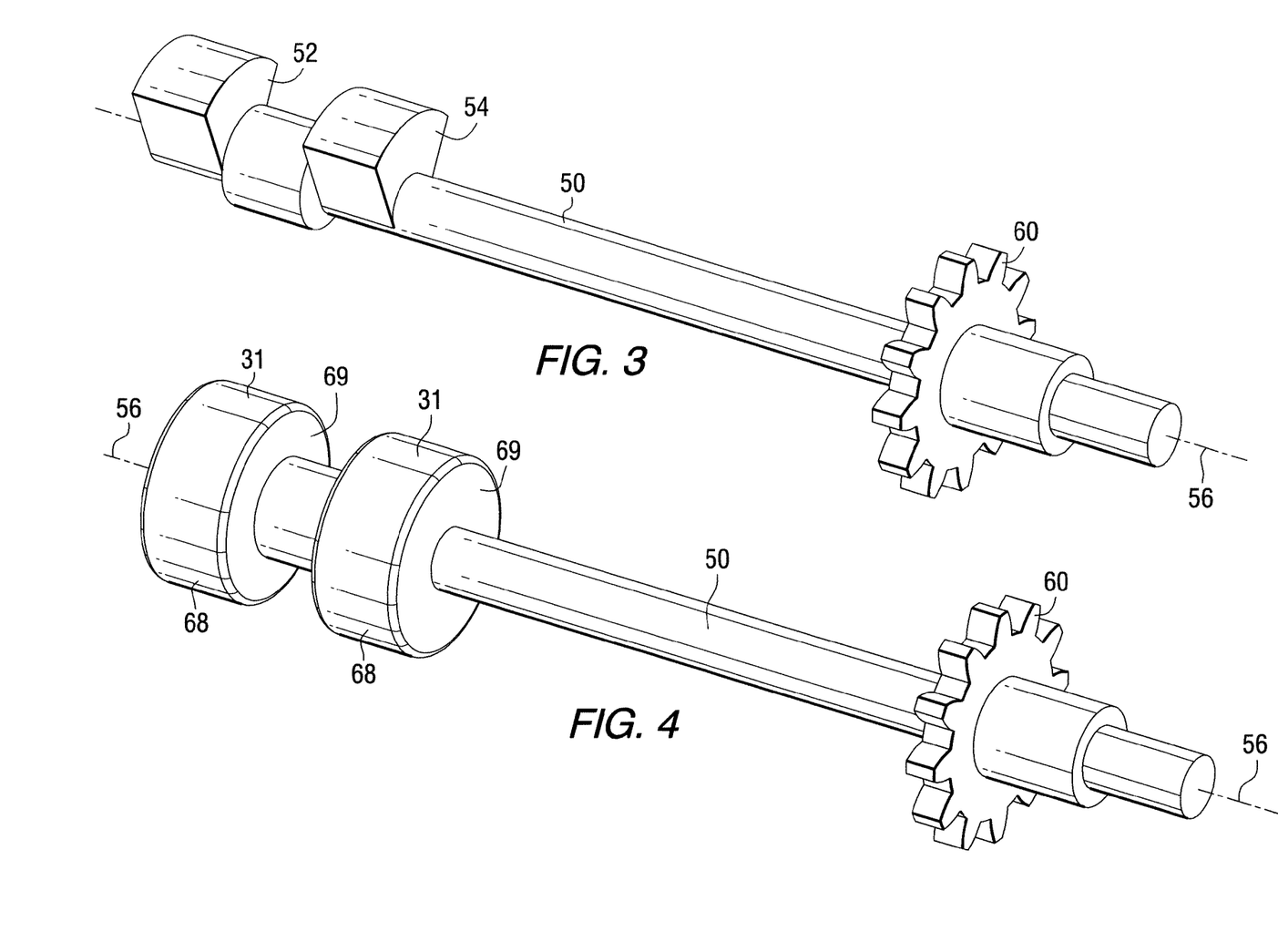
FIG. 3 illustrates a balance shaft that can be used in accordance with a preferred embodiment of the present invention.
FIG. 4 illustrates a preferred embodiment of the present invention which overmolds the counterweights of the balance shaft with a polymer material.

FIG. 3 illustrates a balance shaft used in conjunction with an internal combustion engine. It comprises a shaft 50 and a pair of counterweights, 52 and 54. The counterweights are attached to the shaft 50 for rotation with the shaft about the axis of rotation 56. Each of the counterweights has an individual center of gravity which is displaced radially from the axis of rotation. As can be seen in FIG. 3, the shapes of the counterweights, 52 and 54, indicate that the center of gravity of the counterweights is above the axis 56 in FIG. 3. Also shown in FIG. 3 is a gear 60 which allows the balance shaft to be connected in torque transmitting relation with a gear associated with the crankshaft of the engine.

With continued reference to FIGS. 1-3, it should be understood that the counterweights of the balance shaft, in certain engines of the type described above, are disposed within the oil reservoir 16. When the balance shaft rotates about the axis of rotation 56, the irregular shape of the outer surface of the counterweights will stir the oil in a highly disadvantageous manner. Since the balance shaft rotates at a relatively high speed, the repeated turbulent and violent contact between the external surfaces of the counterweights and the pool of oil in the oil reservoir 16 will deleteriously aerate the liquid oil as it is stored awaiting its travel to regions of the engine 10 requiring lubrication. This circumstance is highly disadvantageous.

FIG. 4 shows the balance shaft described above in conjunction with FIG. 3, but with the counterweights encased in a polymer material that is overmolded around the external surface of the counterweights.

With reference to FIGS. 2 and 4, the section view in FIG. 2 illustrates the relative positions of the counterweights (identified by reference numerals 41 and 42 in FIG. 2) and their positions within the mass of polymer material. The overmolded polymer material in FIG. 2 is identified by reference numerals 31 and 32 for the two balance shafts and by reference numeral 31 in FIG. 4 for the illustrated balance shaft. With continued reference to FIGS. 2 and 4, it can be seen that the counterweights are completely surrounded by the polymer material (such as polyetheretherketone—PEEK). The resulting outer surface illustrated in FIG. 4 causes significantly less turbulence in the oil reservoir than the uncoated counterweights, 52 and 54, as illustrated in FIG. 3. The overmolded polymer material creates and defines a circumferential surface 68 which surrounds the counterweights and has a generally constant radius relative to the axis of rotation 56. These characteristics cooperate to significantly reduce the resulting turbulence in the oil reservoir as the balance shaft rotates about its axis of rotation.

Figure 5:
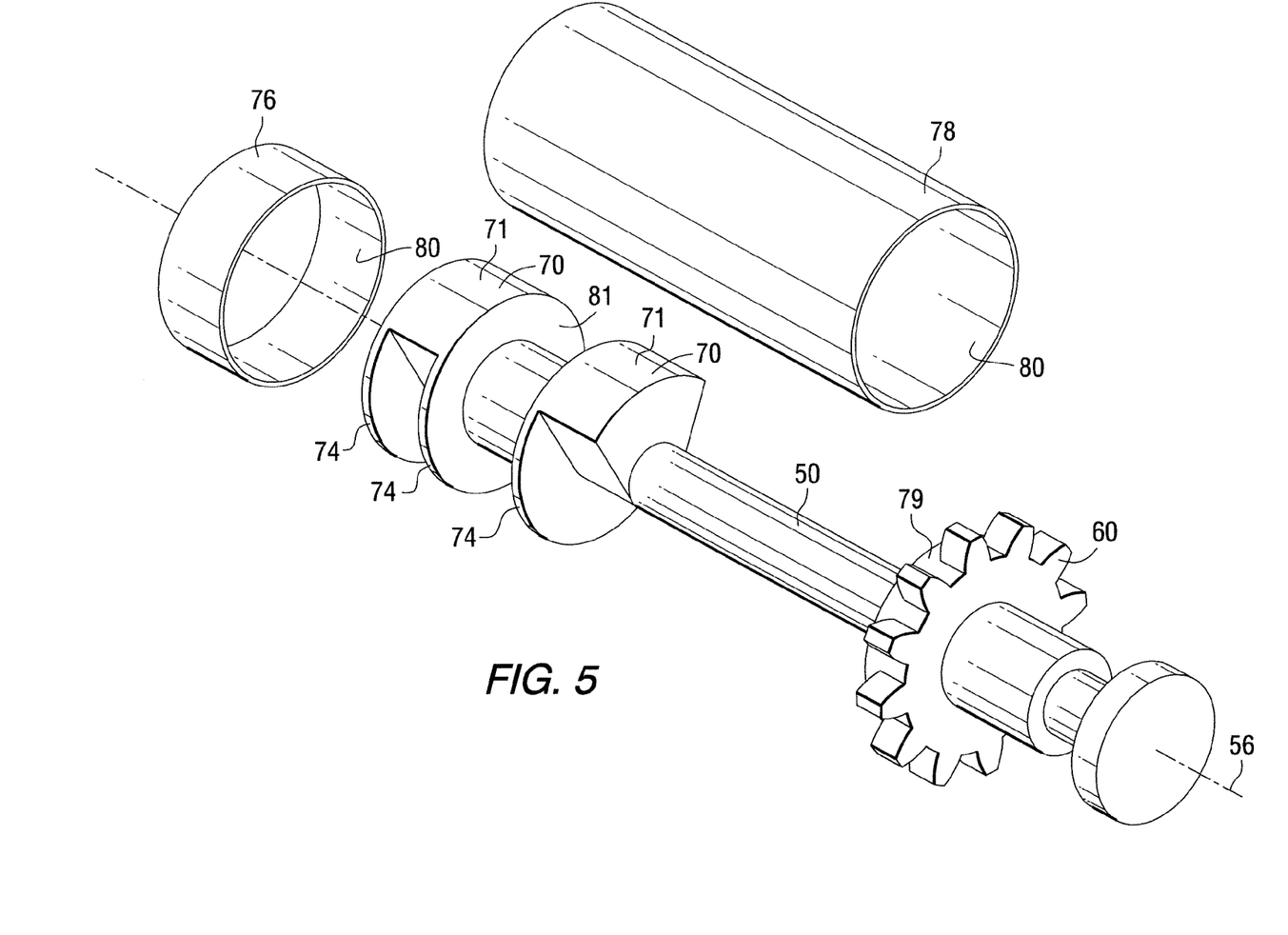
FIGS. 5 and 6 show an embodiment of the present invention that uses cylindrical casings to cover the counterweights of a balance shaft.

FIG. 5 shows an alternative embodiment of the present invention in which the counterweights 70 are provided with additional circumferential surfaces 74 that are sized to receive cylindrical casings, 76 and 78. The inside diameters 80 of the casings are attached to the circumferential surfaces 74 in order to allow them to cover the various discontinuous surfaces that would otherwise create turbulence in the oil reservoir. It can also be seen that a surface 79 formed as part of the gear 60 is also shaped to receive the inside surface 80 of the cylindrical casing 78. When the cylindrical casings are disposed at their intended positions of the balance shaft, the resulting configuration is that which is represented in FIG. 6.

Figure 6:
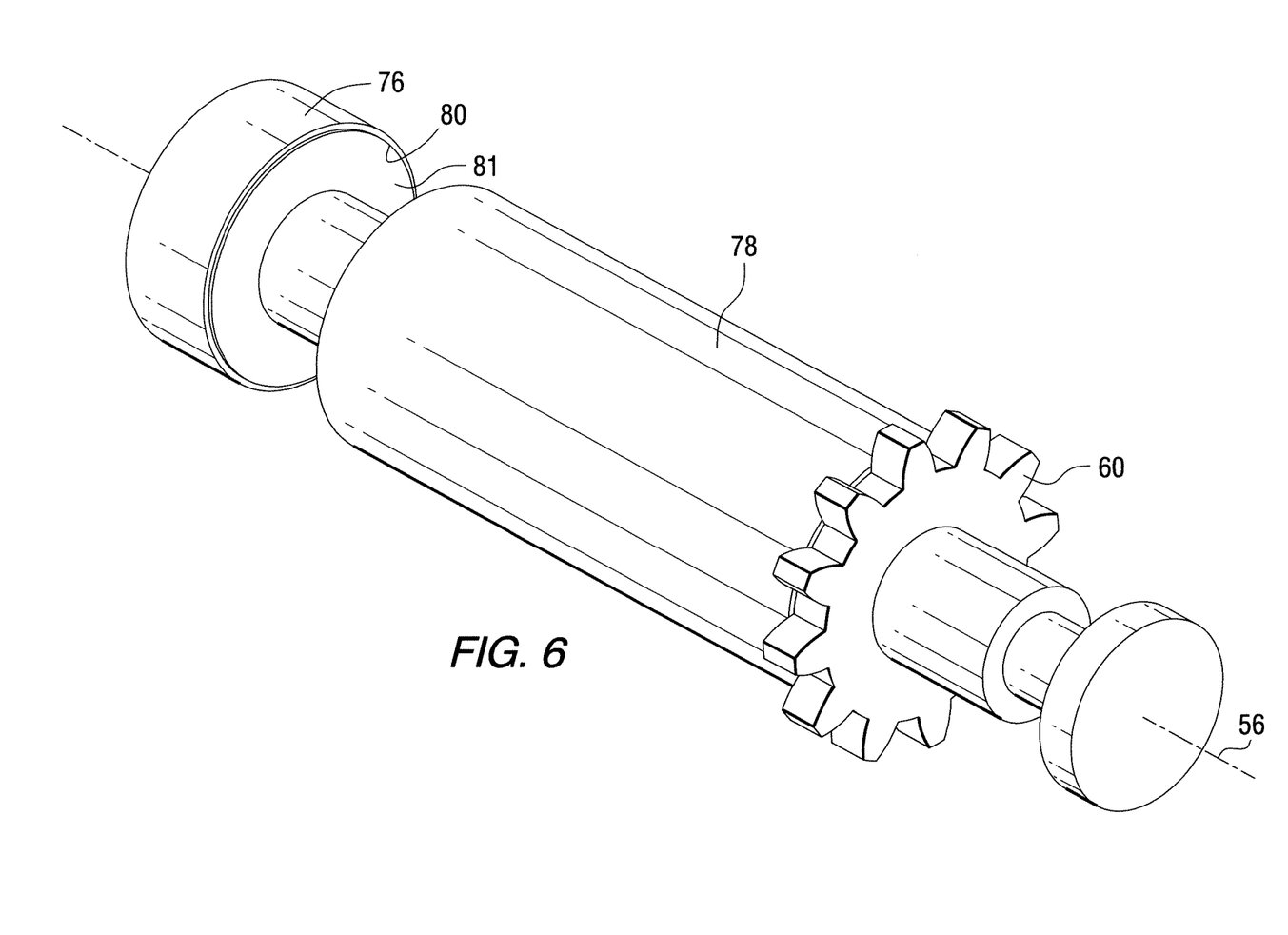

In FIG. 6, it can be seen that the cylindrical casings, 76 and 78, provide a cover that extends over the counterweight 70, as shown in FIG. 5, and the extended circumferential surfaces 74 which are purposely used to provide a more stable base for the attachment of the casing, 76 and 78.

Figure 7:
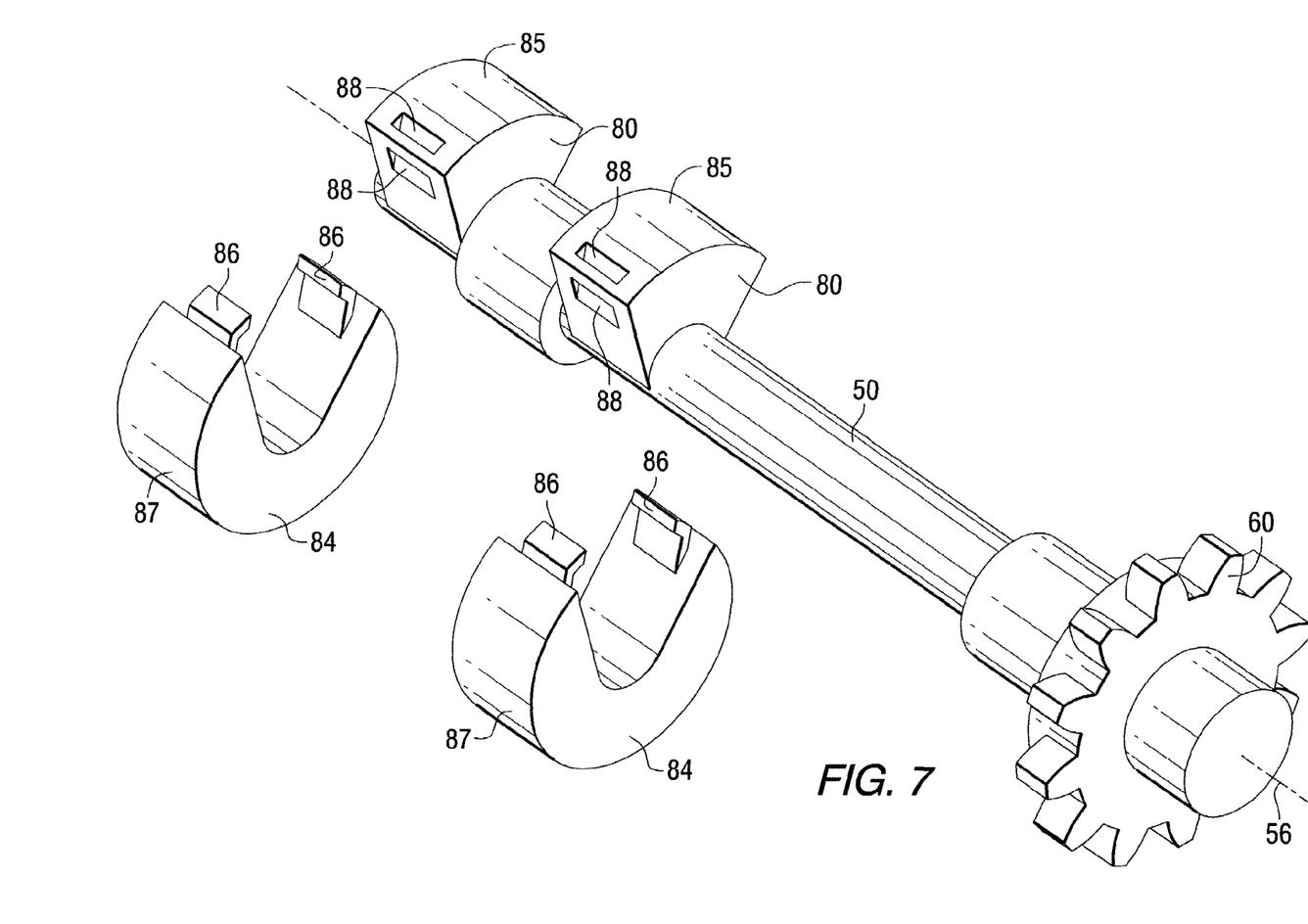
FIGS. 7 and 8 show an alternative embodiment of the present invention which attaches a partial disc shaped casing to the counterweights of a balance shaft in order to provide a generally full and complete disc shaped structure with no discontinuities that would otherwise create turbulence and aeration of oil in which the balance shafts are submerged.

FIG. 7 shows a balance shaft and two casings, 84 made in accordance with one of the alternative embodiments of the present invention. The casings 84 are made of a relatively light material, such as a polymer, so that they can fulfill the function of providing a relatively smooth outer surface without affecting the location of the center of gravity provided by the counterweights 80. In the embodiment shown in FIG. 7, the counterweight comprises a segment of a disc, approximately two-thirds of a complete disc, which is shaped to cooperate with the counterweight 80 to define a generally disc-shaped structure when the casing is combined with the counterweight as will be described below. The casing comprises tabs 86 which are shaped to be received in slots 88.

Figure 8:
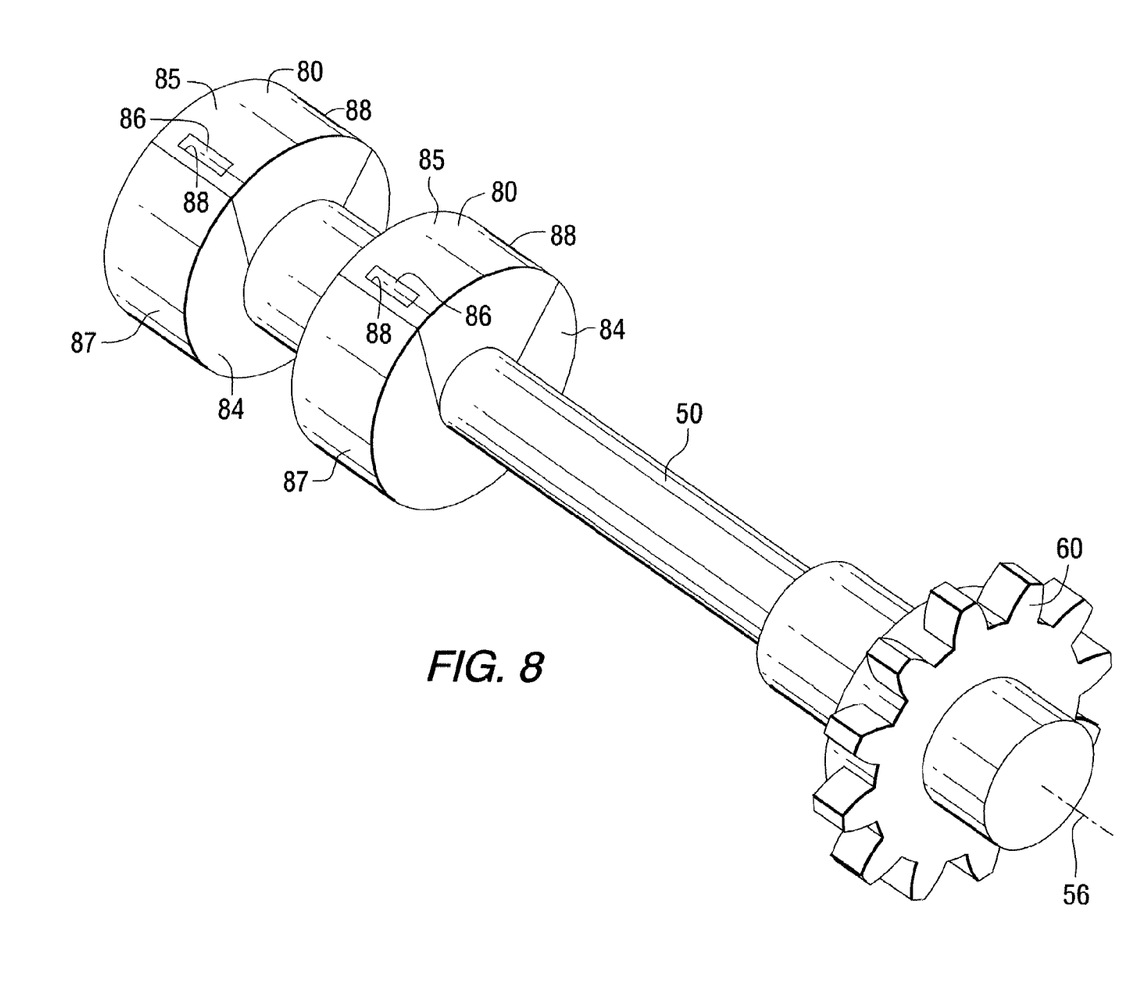

FIG. 8 shows the casings 84 assembled to the counterweights 80 with the tabs 86 disposed in the slots 88 to retain the casings in position as shown in FIG. 8. With the casings 84 in the position shown in FIG. 8, the outer surface of the combined structure of counterweight and casing is relatively smooth and provides a circumferential outer surface with a generally constant radius relative to the axis of rotation 56. This type of structure, as described above, significantly reduces the likelihood that rotation of the balance shaft will cause turbulent splashing of the oil in which the balance shaft is at least partially submerged.

Throughout the description of the various embodiments of the present invention, the term "casing" has been used along with the term "housing structure" to describe the components identified by reference numerals 31, 76, 78, and 84. A well-excepted definition of the term "casing" is "a cover or shell that protects or encloses something." Another definition of the word "casing" is "a container or cover that goes around something to hold it together or protect it." As used in the description of the various embodiments of the present invention, this word is used to describe a component that covers at least a portion of the counterweight in order to give the counterweight a smooth outer surface while covering discontinuities in that surface that would otherwise create turbulence and cause aeration when the counterweight is rotated with the balance shaft while being submerged or partially submerged in oil within the crankcase of an engine, as described above in conjunction with FIGS. 1 and 2. Although other terms may be available to describe this type of component, it should be understood that the casing of the present invention is intended to perform the function of covering discontinuous surfaces and presenting a generally continuous surface in contact with the oil as the balance shaft rotates. In most embodiments of the present invention, this exposed surface of the casing is generally cylindrical and has a generally constant radial distance from the axis of rotation of the balance shaft. Although non-cylindrical surfaces may also be able to accomplish these goals and be within the scope of the present invention, the most preferred embodiments of the present invention are generally similar in character to the embodiments described above in conjunction with FIGS. 3-8.

In the embodiment of the present invention described above in conjunction with FIGS. 3 and 4, the entire counterweight which extends from the shaft 50 is surrounded by a polymer overmolded material to create the smooth surfaces shown in FIG. 4. As illustrated in the section views of FIG. 2, the embodiment shown in FIG. 4 completely surrounds the counterweight which is identified by reference numerals 41 and 42 in FIG. 2 and by reference numerals 52 and 54 in FIG. 3. This causes both the circumferential surfaces 68 and axial surfaces 69 to comprise the polymer overmolded material. All of the other surfaces of the counterweights 54 extending away from the shaft 50 are covered by the casing 31.

The embodiment of the present invention described above in conjunction with FIGS. 5 and 6 differs slightly from the embodiment described in conjunction with FIGS. 3 and 4 in that the casing, 76 and 78, covers the radially outward surfaces of the counterweight 80, but not the axial faces. In other words, the circumferential surfaces 71 are covered by the casings, 76 and 78, but the axial faces 81 are not. However, the casings, 76 and 78, serve the important function of providing a smooth and continuous surface that is unlikely to cause aeration when the balance shaft rotates within the liquid oil pool. The provision of the circumferential mounting surfaces 74 also assure that the exposed axial faces of the counterweights are also relatively smooth and without protrusions or discontinuities that would otherwise aerate the oil.

The embodiment of the present invention described above in conjunction with FIGS. 7 and 8 provide a relatively smooth circumferential surface that, when the casing 84 is attached to the counterweight 80, comprises the surface 85 of the counterweights with surface 87 of the casings 84 to provide a completely circumferential surface without any major discontinuities that could aerate the oil as the balance shaft 50 rotates. The axial faces of the combined casings 84 and counterweights 80, as illustrated in FIG. 8, are also relatively flat without major discontinuities that could create turbulence in the oil pool.

With continued reference to FIGS. 1-8, it can be seen that a shaft of an engine made in accordance with a preferred embodiment of the present invention comprises a counterweight attached to the shaft for rotation with the shaft about an axis of rotation, wherein the counterweight has a center of gravity which is displaced radially from the axis of rotation. The present invention also comprises a casing disposed at least partially around the counterweight to define an outer surface surrounding the counterweight. The outer surface can comprise a generally circumferential surface which has a generally constant radius relative to the axis of rotation. The casing can comprise a polymer material which is overmolded on the counterweight. All surfaces of the counterweight in certain embodiments of the present invention, which are not directly in contact with the shaft, are completely encased within the polymer material. The casing, alternatively, can be a cylinder disposed in contact with a radially outward surface of the counterweight. The casing can also comprise a segment of a disc which is shaped to cooperate with the counterweight to define a generally disc shaped structure when the housing structure is combined with the counterweight. In that particular embodiment of the present invention, the casing can comprise a tab which is shaped to be received in a slot formed in the counterweight. In all embodiments of the present invention, the shaft can be a balance shaft which rotates in synchrony with a crankshaft of the engine. Alternatively, in some embodiments of the present invention, the shaft can be a crankshaft of the engine.

Although the present invention has been described in particular detail and illustrated to show a preferred embodiment, it should be understood that alternative embodiments are also within its scope.

We claim:

1. A shaft of an engine, comprising:
a counterweight attached to said shaft for rotation with said shaft about an axis of rotation, said counterweight having a center of gravity which is displaced radially from said axis of rotation; and
a casing disposed at least partially around said counterweight to define an outer surface surrounding said counterweight, said casing comprising a polymer material which is over molded on said counterweight, all surfaces of said counterweight which are not directly in contact with said shaft being completely encased within said polymer material.

2. The shaft of claim 1, wherein:
said outer surface comprises a generally circumferential surface which has a generally constant radius relative to said axis of rotation.

3. The shaft of claim 1, wherein:
said shaft is a balance shaft which rotates in synchrony with a crankshaft of said engine.

4. The shaft of claim 1, wherein:
said shaft is a crankshaft of said engine.

5. A shaft of an engine, comprising:
a counterweight attached to said shaft for rotation with said shaft about an axis of rotation, said counterweight having a center of gravity which is displaced radially from said axis of rotation; and
a casing disposed at least partially around said counterweight to define an outer surface surrounding said counterweight, said shaft being a balance shaft of said engine, said outer surface comprising a generally circumferential surface which has a generally constant radius relative to said axis of rotation, said casing comprising a polymer material which is over molded on said counterweight, all surfaces of said counterweight which are not directly in contact with said shaft being completely encased within said polymer material.

* * * * *